W. SIMONS.
BICYCLE SIDE CAR.
APPLICATION FILED FEB. 23, 1918.

1,302,476.

Patented Apr. 29, 1919.
2 SHEETS—SHEET 1.

Witnesses

Inventor
William Simons
By Victor J. Evans
Attorney

W. SIMONS.
BICYCLE SIDE CAR.
APPLICATION FILED FEB. 23, 1918.

1,302,476.

Patented Apr. 29, 1919.
2 SHEETS—SHEET 2.

Inventor
William Simons
By Victor J. Evans
Attorney

Witnesses

UNITED STATES PATENT OFFICE.

WILLIAM SIMONS, OF BALTIMORE, MARYLAND.

BICYCLE SIDE CAR.

1,302,476.  Specification of Letters Patent.  Patented Apr. 29, 1919.

Application filed February 23, 1918. Serial No. 218,866.

*To all whom it may concern:*

Be it known that I, WILLIAM SIMONS, a citizen of the United States, residing at Baltimore, Maryland, have invented new and useful Improvements in Bicycle Side Cars, of which the following is a specification.

This invention is an improved side car to be attached to one side of a bicycle or other similar vehicle and used in connection therewith and to be propelled and carried thereby.

The object of the invention is to provide an improved side car of this character which can be readily attached to or removed from a bicycle, and which is simple in construction, strong and durable, and requires the use of only one supporting wheel.

With the above and other objects in view the invention consists in the construction, combination and arrangement of devices hereinafter described and claimed.

In the accompanying drawings:—

Figure 1:
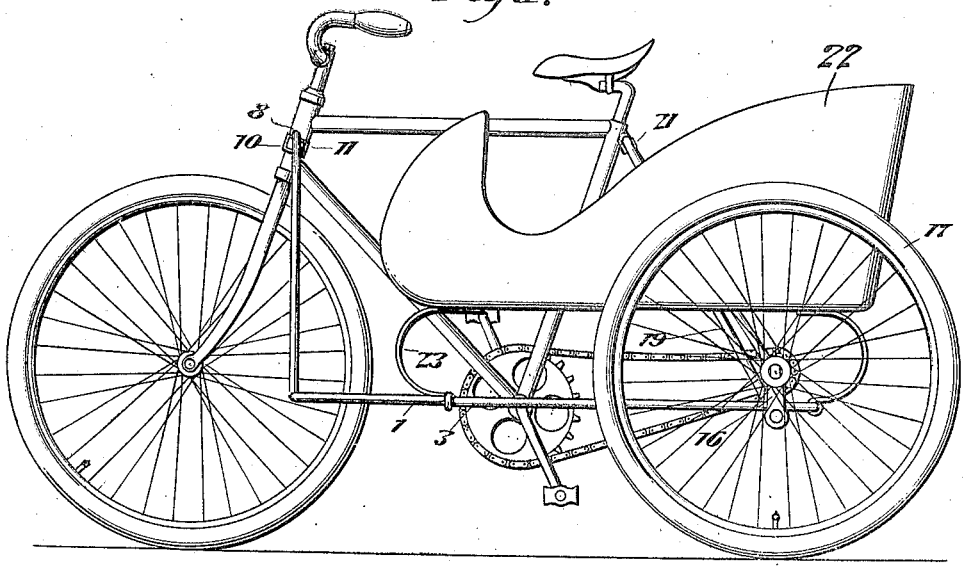
Figure 1 is an elevation of a bicycle side car constructed and arranged in accordance with my invention and showing the same attached to a bicycle.
Figure 2:
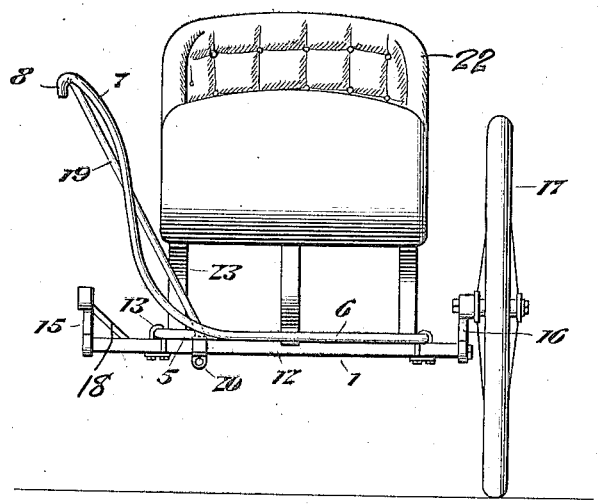
Fig. 2 is a detailed front elevation of the same.
Figure 3:
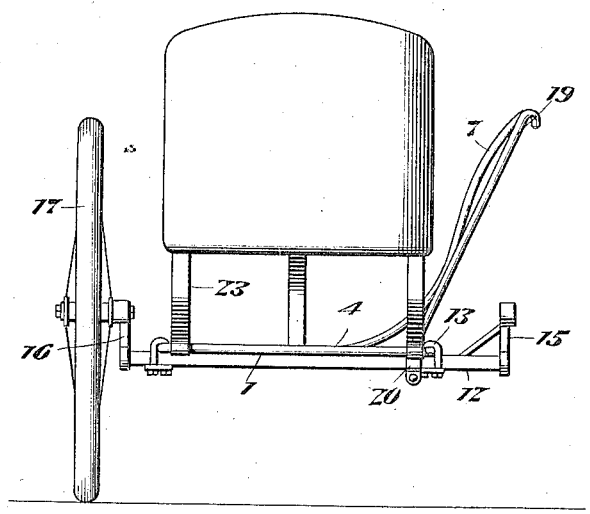
Fig. 3 is a detailed rear elevation of the same.
Figure 4:
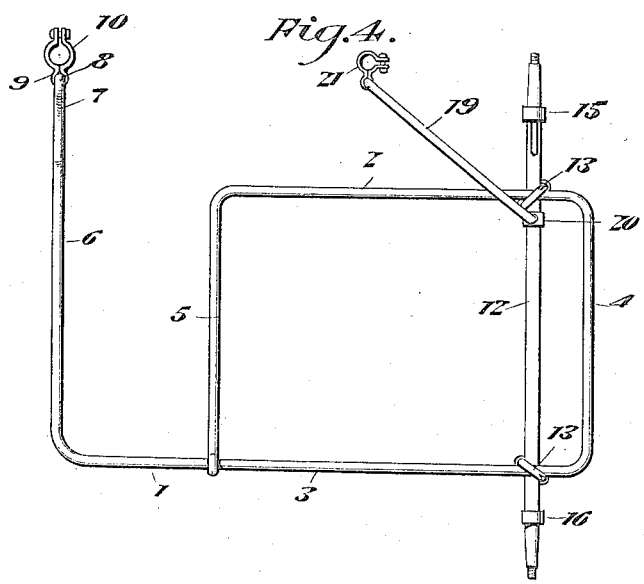
Fig. 4 is a plan of the frame of the side car.

In the embodiment of my invention I provide a frame 1 which is mainly made from a single rod of iron or steel of suitable length and gage. The said rod is bent to form an inner reach 2, an outer reach 3, a rear connecting bar 4, a front connecting bar 5, and a front hanger 6 which extends forwardly from the outer reach, is bent inwardly and is formed with an upwardly extending hanger arm 7 which terminates in downwardly directed hook 8. This hook is adapted to be placed in a vertical opening 9 of a clip or cuff 10, the said cuff being secured to the front of the bicycle frame as at 11.

A rear axle 12 is provided which is secured to the rear end of the frame by suitable means such as clip bolts 13. The ends of the axle are reduced. A drop hanger 15 is secured to the reduced inner end of the axle and a similar drop hanger 16 is secured to the outer end thereof and is provided at its upper end with an outwardly extending spindle on which is mounted a wheel 17 which serves to support the side car. A brace 18 is provided for the inner drop hanger. The upper end of the inner drop hanger is provided with an opening for the reception of one end of the rear axle of the bicycle so that the rear axle of the frame of the side car is directly attached to and partly supported by the rear axle of the bicycle. A brace 19 has its lower end secured to the rear axle 12 as by means of a suitable clip bolt 20. The upper end of said brace is adapted to be secured to the frame of the bicycle at a point under the seat as by means of a suitable cuff 21. The body 22 of the side car may be of the form here shown or of any suitable construction and is mounted on springs 23 which springs are attached to the front cross bar 5 of the frame and to the rear cross bar 4, as shown.

While I have herein shown and described a preferred form of my invention I would have it understood that changes may be made in the form, proportion, and construction of the several parts, without departing from the spirit of my invention and without exceeding the scope of the appended claims.

Having described the invention what is claimed is:—

1. A bicycle side car having an oblong rectangular frame comprising front and rear cross bars, an inner reach and an outer reach, said outer reach extending forwardly from the frame and having at its front end an inwardly and upwardly inclined hanger arm arranged in front of the frame and provided with means whereby it may be attached to the front portion of a bicycle frame, a rear axle secured to the first named frame and provided at its outer end with a supporting wheel and also provided at its inner end with means whereby said axle may be attached to the rear axle of the bicycle, and a brace attached to the rear axle and having means at its upper end whereby it may be attached to the rear portion of the bicycle frame.

2. A bicycle side car having a frame comprising a rod bent to form an inner reach, an outer reach, a rear connecting bar and a front connecting bar, and also forming a hanger arm which extends forwardly from the outer reach and also extends transversely across the front bend of the frame and upwardly therefrom, said hanger arm being provided with means whereby the same may be attached to the front of a bicycle frame, and a rear axle secured to the first named frame and provided at its outer end with a supporting wheel and also provided at its inner end with means for attaching said axle to the rear axle of a bicycle, and a brace attached to the rear axle near its inner end and extending upwardly and adapted to be connected at its upper end to the rear portion of the bicycle frame.

In testimony whereof I affix my signature.

WILLIAM SIMONS.

Copies of this patent may be obtained for five cents each, by addressing the "Commissioner of Patents, Washington, D. C."